Jan. 16, 1923.
E. M. STERNBERG.
DIFFERENTIAL MECHANISM.
FILED JAN. 17, 1922.
1,442,498
2 SHEETS-SHEET 1
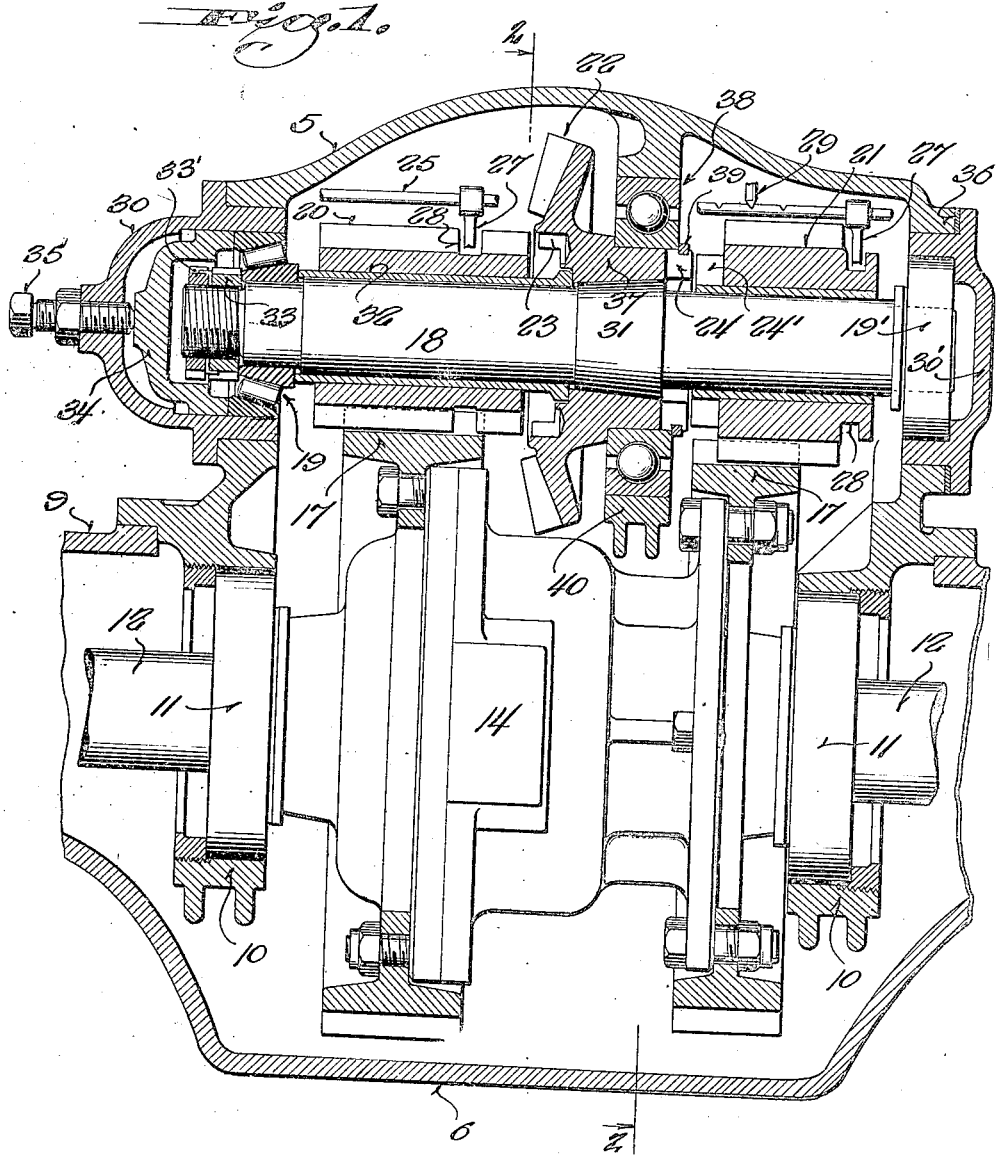
Inventor:
Ernst M. Sternberg
By Young and Young
Attorneys

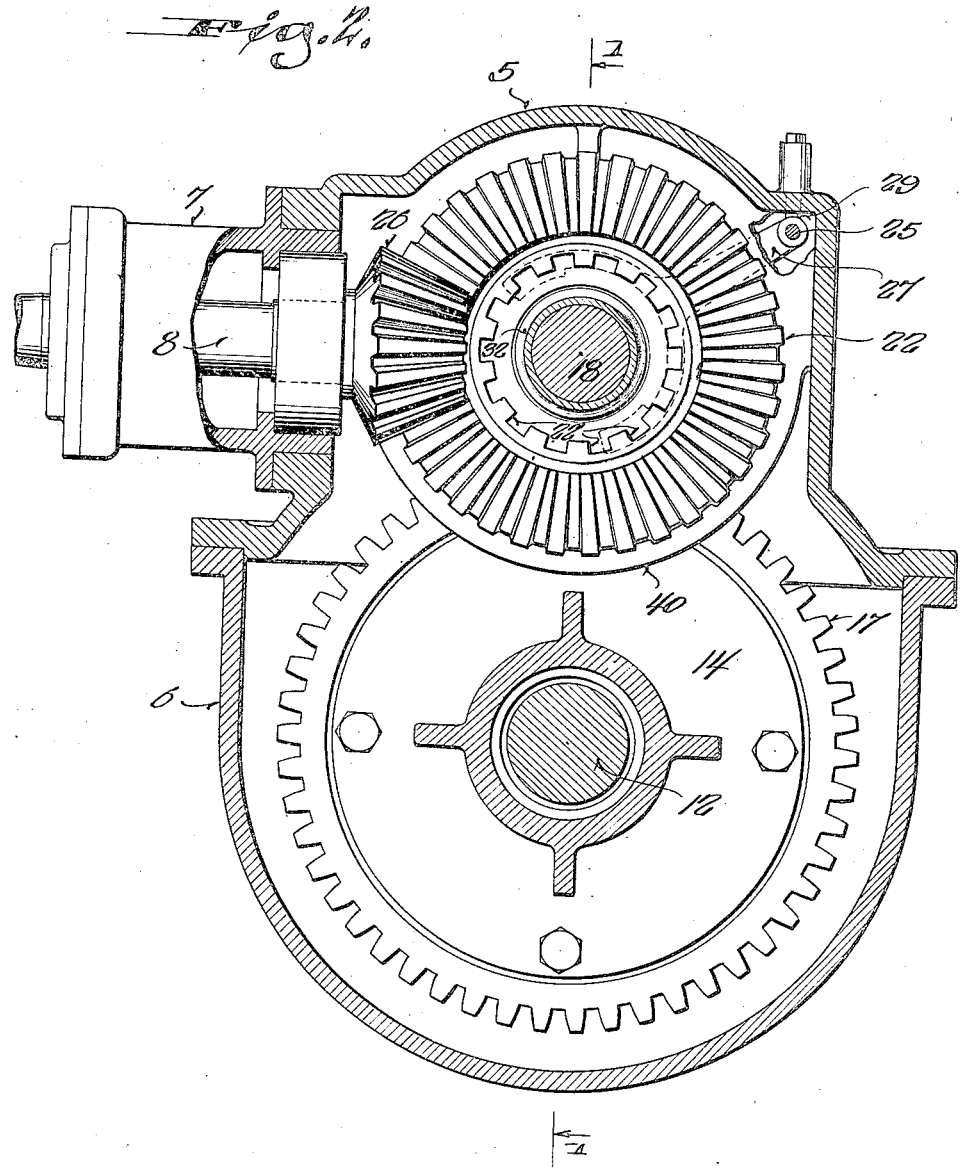

Patented Jan. 16, 1923.

1,442,498

UNITED STATES PATENT OFFICE.

ERNST M. STERNBERG, OF WEST ALLIS, WISCONSIN.

DIFFERENTIAL MECHANISM.

Application filed January 17, 1922. Serial No. 529,875.

*To all whom it may concern:*

Be it known that I, ERNST M. STERNBERG, a citizen of the United States, and resident of West Allis, in the county of Milwaukee and State of Wisconsin, have invented certain new and useful Improvements in Differential Mechanism; and I do hereby declare that the following is a full, clear, and exact description thereof.

This invention relates to improvements in transmission gearing, and more particularly to that type of gearing contained in an axle differential housing for motor trucks, such as disclosed in my Patent No. 1,334,325, March 23, 1920.

The structure disclosed in the foregoing patent, to which reference may be had, necessitates offsetting of the differential, and consequently the differential bowl or housing, with reference to the center of the axle and the axis of the propeller shaft, which results in an unbalanced structure that is objectional both from the standpoint of practicability and appearance. Further, because of the wide faced spur gears necessary in this particular type of axle, where the same is applied to heavy duty trucks, an extremely large and consequently heavy casing is required to house the same in order to permit room for sliding the gears in and out of engagement.

It is, therefore, an object of my present invention to overcome these objectionable features and provide an economical structure of this character which is efficient in operation, compact and light in structure, and alined centrally with relation to the axle.

Another object is to eliminate the necessity of using splines or keys on the jack shaft, by the provision of clutches formed integral with the gears mounted thereon, thus permitting of a shaft of minimum length and maximum strength, and incidentally permitting transmission of power directly through the gears, which eliminates torque strain on the shaft.

A further object is to provide an arrangement wherein the maximum load is transmitted to the jack shaft at points adjacent the shaft journals or supports, thus relieving strain on the same.

A still further object resides in the provision of means whereby the bevel gear on the jack shaft may be adjusted to properly mesh with the driving gear.

With the foregoing and other objects in view, which will be more apparent as the description proceeds, my invention consists in what is herein shown and described, and more particularly pointed out and defined by the appended claims.

In the accompanying drawings, I have illustrated one embodiment of the present invention, but it is understood that various changes in details of construction are contemplated as within the invention.

In the drawings,

Figure 1 is a vertical, sectional view through an axle housing embodying the invention, and Figure 2 is a transverse, vertical section taken on the line 2—2 of Figure 1.

Referring now more particularly to the accompanying drawings, 5 and 6 designate, respectively, upper and lower sections of the casing of my improved axle, the upper section having a bearing extension 7 for the propeller shaft 8 of the power plant, while the ends of the lower casing sections are extended to form axle housings 9. The upper casing section 5 carries the conventional depending hangers 10, in which are mounted anti-frictional bearings 11, having journalled therein, a pair of wheel drive shafts 12 which extend through the housing.

The differential mechanism is of conventional structure and is contained within the housing 14 which is mounted on the ends of the wheel shafts 12. Secured to the housing 14 are a pair of gears 17 of a different diameter, whereby either of two differing rotative speeds may be imparted to the differential mechanism. A jack shaft 18 positioned adjacent and above the differential housing, is journally mounted in anti-frictional bearings 19 and 19' carried respectively by the removable bearing caps 30 and 30', secured in the main casing section 5. The jack shaft 18 is provided with a central conical portion 31 on which is secured the bevel gear 22, the same being held into place by a spacing sleeve 32, which in turn is held against longitudinal movement on the jack shaft by the inner race of the anti-frictional bearings 19. A jam nut 33 and lock nut 33', threaded on the end of the jack shaft, serve to retain the inner race.

The bevel gear 22 is provided with an elongated hub 37 on which the inner race of a ball bearing 38 is mounted, the same being retained on the hub by means of a spring washer 39. The bearing 38 is slidably mounted within the hanger 40 for the purpose which shall be described later in the specification. Slidably journalled on the jack shaft 18 on opposite side of the bevel gear 22 are a pair of gear wheels 20 and 21 of relatively large and small diameter, which gear wheels are constantly in mesh with the gears 17 carried by the differential housing. The face of the bevel gear 22, adjacent the gear 20, is recessed and provided with internal gear teeth 23 adapted to mesh with the teeth of the gear 20 for a selective driving connection with the same, while the end of the hub 37 is provided with jaw clutches 24 adapted to be engaged by similar clutches 24' which form an integral part of the gear 21. The gears 20 and 21 are shifted by a rod 25 having spanner connections 27 engaging the annular recesses 20 formed in said gear wheels, said rod being yieldably held in its various positions by a conventional spring detent 29.

In order to provide an adjustment whereby the bevel gear 22 may be properly meshed with its driving gear after the entire mechanism has been assembled, a spacing shim 36 of the proper thickness is placed between the casing 5 and the cap 30 and serves to longitudinally adjust the jack shaft together with the bevel gear secured thereon. A thrust collar 34 positioned interiorly of the cap 30 engages the outer race of the antifrictional bearing 19, which bearing employs conical rollers and in addition to taking lateral strain serves as an end thrust bearing. The thrust collar is adjusted by means of a set screw 35 to take up any longitudinal play of the jack shaft. It will be noted in connection with the adjustment of the bevel gear 22 that the outer ball race of the bearing 38 is slidably mounted within the bearing hanger 40, thus permitting longitudinal movement of the bevel gear 22 on the axial line of the jack shaft.

From the foregoing description taken in connection with the drawings, it will be seen that a simple, compact, and efficient variable speed mechanism, embodying the proper gear reduction ratios, has been provided, in which the arrangement of parts is such that a slight movement of the variable speed gears will obtain the desired gear ratio.

Particular attention is further directed to the fact that the jack shaft is supported at three points, thereby permitting the use of a shaft of minimum size, which is essential in order to obtain the proper size gears within a compact housing.

Other important advantages of the present invention reside in the specific method of journalling the hub of the bevel gear 22 in the hanger 40, thus providing a central support for the jack shaft without increasing the length of the same, and in the method of adjusting the meshing of the bevel gear after the entire mechanism is assembled.

I claim:—

1. A mechanism of the class described including a casing, a pair of drive shafts journalled in said casing, a differential connection between said drive shafts, gears carried by the differential connection, a jack shaft journalled within the housing adjacent said differential connection, a driven gear secured on the jack shaft, gears slidably mounted on said jack shaft on opposite sides of said driven gear, said slidable gears being constantly in mesh with the gears on the differential connection, and means for selectively connecting the slidable gears to the driven gear.

2. A mechanism of the class described including a casing, a pair of drive shafts journalled in said casing, a differential connection between said drive shafts, gears carried by the differential connection, a jack shaft journalled within the housing adjacent said differential connection, a driven gear secured on the jack shaft, gears slidably mounted on said jack shaft on opposite sides of said driven gear, said slidable gears being constantly in mesh with the gears on the differential connection, and clutch members carried by the driven gear and slidable gears for selectively connecting the same.

3. A mechanism of the class described including a casing, a pair of drive shafts journalled in said casing, a differential connection between said drive shafts, gears carried by the differential connection, a jack shaft journalled within said casing adjacent the differential connection, a driven gear secured on the jack shaft, slidable gears loosely journalled on said jack shaft, said gears being constantly in mesh with the gears on the differential connection and adapted to be slid on the jack shaft for selective engagement with the driven gear.

4. A mechanism of the class described including a casing, a pair of drive shafts journalled in said casing, a differential connection between said drive shafts, gears carried by the differential connection, a jack shaft adjacent said differential connection, a driven gear secured on the jack shaft and provided with a hub extension, a bearing surrounding said hub, gears slidably mounted on said jack shaft on opposite sides of said driven gear for engagement with the gears on the differential connection, and clutch members carried by the driven gear and slidable gears whereby the latter may be selectively connected to the driven gear.

5. A mechanism of the class described including a casing, a pair of drive shafts journalled in said casing, a differential connection between said drive shafts, gears carried by the differential connection, a jack shaft journalled within said casing adjacent said differential connection, a driven gear secured on said jack shaft and provided with a hub extension, a bearing hanger carried by the casing, a slidable bearing, for said hub extension, mounted in said hanger to permit adjustment of the driven gear with relation thereto, means for adjusting said driven gear, and a pair of gears mounted on said jack shaft for engaging the gears on the differential connection.

6. A mechanism of the class described including a casing, a propeller shaft journalled in said casing and provided with a driving gear, a pair of drive shafts journalled in said casing, a differential connection between said drive shafts, gears carried by the differential connection, a jack shaft journalled within said casing adjacent said differential connection, a gear secured on said jack shaft and meshing with said driving gear, and means for longitudinally adjusting said jack shaft comprising bearings for the ends of said shaft, removable bearing caps for receiving said bearings, means for adjusting one of the bearing caps with relation to the casing, and means carried by the other of said bearing caps for adjusting the bearing contained therein to take up longitudinal play of the shaft.

In testimony that I claim the foregoing I have hereunto set my hand at Milwaukee, in the county of Milwaukee and State of Wisconsin.

ERNST M. STERNBERG.